(12) United States Patent
Tang et al.

(10) Patent No.: US 10,890,451 B2
(45) Date of Patent: Jan. 12, 2021

(54) PLACE OF INTEREST RECOMMENDATION

(71) Applicant: Tencent Technology (Shenzhen) Company Limited, Guangdong (CN)

(72) Inventors: Wenrong Tang, Guangdong (CN); Guangyuan Bai, Guangdong (CN); Yan Wang, Guangdong (CN); Daihua Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 561 days.

(21) Appl. No.: 15/615,441

(22) Filed: Jun. 6, 2017

(65) Prior Publication Data

US 2017/0268886 A1    Sep. 21, 2017

Related U.S. Application Data

(63) Continuation of application No. 14/678,421, filed on Apr. 3, 2015, now Pat. No. 9,702,711, which is a
(Continued)

(30) Foreign Application Priority Data

Sep. 16, 2013  (CN) .......................... 2013 1 0423214

(51) Int. Cl.
*G01C 21/26* (2006.01)
*H04L 12/58* (2006.01)
(Continued)

(52) U.S. Cl.
CPC ......... *G01C 21/26* (2013.01); *G01C 21/3679* (2013.01); *H04L 51/20* (2013.01);
(Continued)

(58) Field of Classification Search
CPC ..... G01C 21/26; G01C 21/3679; H04L 67/12; H04L 67/104; H04L 51/20; H04L 51/03; H04W 4/023
See application file for complete search history.

(56) References Cited

U.S. PATENT DOCUMENTS 9,813,495 B1 * 11/2017 Van Rensburg ....... G06Q 30/02
2008/0132251 A1 * 6/2008 Altman .............. G06Q 30/0207
455/457
(Continued)

FOREIGN PATENT DOCUMENTS

CN     101339045 A    1/2009
CN     101532847 A    9/2009
(Continued)

OTHER PUBLICATIONS

International Search Report and Written Opinion dated Nov. 26, 2014 for International Application No. PCT/CN2014/085812, 7 pages.
(Continued)

*Primary Examiner* — Richard M Camby
(74) *Attorney, Agent, or Firm* — Brinks Gilson & Lione

(57) ABSTRACT

A computer server of a social communication platform may be configured to provide a social communication platform to a first user to chat with a second user over a window displaying on a computer device of the first user; receive chat messages between the first user and second user, the chat message including a current geographical location information of the first user; select at least one candidate POI associated with the second user and based on the current geographical location information of the first user; send location information of at least one candidate POI to the first user through the window; receive from the first user a selection of a target POI from the at least one candidate POI;
(Continued)

and send information associated with the target POI to the first user through the social communication platform.

14 Claims, 11 Drawing Sheets

Related U.S. Application Data continuation of application No. PCT/CN2014/085812, filed on Sep. 3, 2014.

(51) Int. Cl.
*G01C 21/36* (2006.01)
*H04W 4/02* (2018.01)
*H04L 29/08* (2006.01)

(52) U.S. Cl.
CPC .......... *H04L 67/104* (2013.01); *H04L 67/12* (2013.01); *H04W 4/023* (2013.01); *H04L 51/32* (2013.01)

(56) References Cited

U.S. PATENT DOCUMENTS

| | | | |
|---|---|---|---|
| 2011/0161427 A1 | 6/2011 | Fortin et al. | |
| 2011/0238735 A1* | 9/2011 | Gharpure | G06Q 10/00 709/203 |
| 2012/0008526 A1 | 1/2012 | Borghei | |
| 2012/0047147 A1* | 2/2012 | Redstone | H04L 67/18 707/748 |
| 2012/0095979 A1 | 4/2012 | Aftab et al. | |
| 2012/0302256 A1 | 11/2012 | Pai et al. | |
| 2013/0132488 A1* | 5/2013 | Bosworth | H04L 51/32 709/206 |
| 2014/0123246 A1* | 5/2014 | Abhyanker | G06Q 10/10 726/4 |
| 2014/0123247 A1* | 5/2014 | Abhyanker | H04L 63/08 726/4 |
| 2014/0130140 A1* | 5/2014 | Abhyanker | H04L 63/08 726/4 |
| 2014/0172974 A1* | 6/2014 | Baldwin | G06Q 50/01 709/204 |
| 2014/0207866 A1* | 7/2014 | Garcia | H04W 4/029 709/204 |
| 2014/0222910 A1* | 8/2014 | Petersen | G06Q 30/02 709/204 |
| 2014/0303807 A1* | 10/2014 | Addepalli | H04W 4/046 701/1 |
| 2014/0317202 A1* | 10/2014 | Baldwin | H04L 65/403 709/206 |
| 2014/0337938 A1* | 11/2014 | Abhyanker | G06Q 10/087 726/5 |
| 2015/0046828 A1* | 2/2015 | Desai | G06F 1/163 715/739 |
| 2015/0074214 A1* | 3/2015 | Petersen | H04L 67/22 709/206 |
| 2015/0106427 A1* | 4/2015 | Tang | H04L 67/18 709/203 |
| 2015/0113447 A1* | 4/2015 | Lineberger | H04W 4/21 715/758 |
| 2015/0141060 A1* | 5/2015 | Shan | H04W 4/21 455/456.3 |
| 2015/0172327 A1* | 6/2015 | Wansley | G06F 3/04842 715/753 |
| 2015/0204680 A1* | 7/2015 | Lee | G01C 21/26 701/408 |
| 2015/0271557 A1* | 9/2015 | Tabe | H04N 21/4788 725/14 |
| 2015/0308838 A1* | 10/2015 | Mishra | G01C 21/32 701/519 |
| 2015/0350349 A1* | 12/2015 | Kao | H04L 67/18 709/204 |
| 2016/0061609 A1* | 3/2016 | Dickey | G01C 21/26 701/400 |

FOREIGN PATENT DOCUMENTS

| | | |
|---|---|---|
| CN | 101603834 A | 12/2009 |
| CN | 102024041 A | 4/2011 |
| CN | 102467511 A | 5/2012 |
| CN | 103096242 A | 5/2013 |
| EP | 2 287 567 A1 | 2/2011 |

OTHER PUBLICATIONS

Office Action dated Feb. 16, 2015 for Chinese Application No. 201310423214.5, 7 pages.
Office Action dated Aug. 31, 2015 for Chinese Application No. 201310423214.5, 3 pages.

* cited by examiner

PLACE OF INTEREST RECOMMENDATION

CROSS-REFERENCE TO RELATED APPLICATIONS

This application is a continuation of U.S. application Ser. No. 14/678,421 filed on Apr. 3, 2015, which is a continuation of International Application No. PCT/CN2014/085812, filed on Sep. 3, 2014, which claims priority to Chinese Patent Application No. 201310423214.5 filed on Sep. 16, 2013, all of which are hereby incorporated herein by reference in their entireties.

TECHNICAL FIELD

The present disclosure relates to the field of Internet technology. Specifically, the present disclosure relates to methods and devices for a place of interest (POI) recommendation as well as obtaining a recommended POI.

BACKGROUND

With the development of Internet technologies, businesses under the Online to Offline (O2O) business model have emerged rapidly. O2O business includes, for example, group purchase websites and intra-city secondhand goods exchange websites. O2O enables users to place an order for a product or a service online through Internet applications and then obtain the product or services offline in a physical store.

However, users of existing O2O applications generally obtain only limited information about products, services, and/or local stores due to insufficient communication between users and vendors. Map information provided by O2O applications generally only indicates distributions (locations of POIs marked in the maps) of physical stores rather than exact address thereof. Thus often times a user will have to look for the address and/or exact location of physical stores by himself, leaving room to improve user-friendliness of the O2O applications and/or services.

SUMMARY

The present disclosure provides methods and devices for a place of interest (POI) recommendation as well as obtaining a recommended POI.

According to an aspect of the present disclosure, a computer server of a social communication platform may comprise a processor-readable storage medium and a processor. The storage medium may store a program for place of interest (POI) recommendation. The processor may be in communication with the storage medium. When executing the program, the processor may be directed to provide a social communication platform to a first user to chat with a second user over a window displaying on a computer device of the first user; receive chat messages between the first user and second user, the chat message including a current geographical location information of the first user; select at least one candidate POI associated with the second user and based on the current geographical location information of the first user; send location information of at least one candidate POI to the first user through the window; receive from the first user a selection of a target POI from the at least one candidate POI; and send information associated with the target POI to the first user through the social communication platform.

According to another aspect of the present disclosure, a method for POI recommendation may comprise the follow steps executed by computer devices: providing a social communication platform to a first user to chat with a second user over a window displaying on a computer device of the first user; receiving a chat message between the first user and second user, wherein the chat message including a current geographical location information of the first user; selecting at least one candidate POI associated with the second user and based on the current geographical location information of the first user; sending location information of at least one candidate POI to the first user through the window; receiving from the first user a selection of a target POI from the at least one POI; and sending information associated with the target POI to the first user through the social communication platform.

According to another aspect of the present disclosure, a processor-readable non-transitory storage medium may store a program for POI recommendation. The program, when executed by a processor, may direct the processor to perform the following acts: providing a social communication platform to a first user to chat with a second user over a window displaying on a computer device of the first user; receiving chat messages between the first user and second user, the chat message including a current geographical location information of the first user; selecting at least one candidate POI associated with the second user and based on the current geographical location information of the first user; sending location information of at least one candidate POI to the first user through the window; receiving from the first user a selection of a target POI from the at least one POI; and sending information associated with the target POI to the first user through the social communication platform.

BRIEF DESCRIPTION OF THE DRAWINGS

The above and other features and advantages will become more apparent by describing in detail example embodiments thereof with reference to the attached drawings in which.

DETAILED DESCRIPTION

Figure 11:
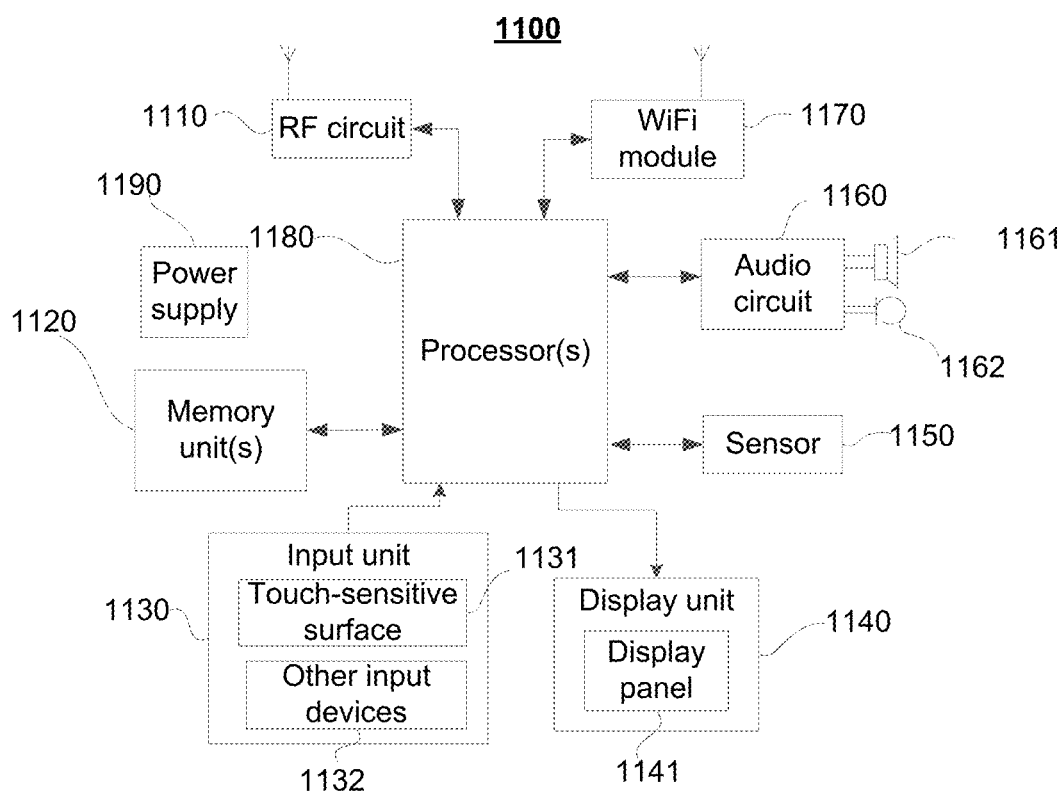
FIG. 11 illustrates a structural diagram of a computer terminal 1100 according to the example embodiments of the present disclosure.

FIG. 11 illustrates a structural diagram of a computer terminal 1100 according to the example embodiments of the present disclosure. The computer terminal may be a mobile device, such as a smartphone, a tablet computer, a palm computer, an ultrabook, or a notebook computer. The computer terminal may also be a server, such as an O2O application server. The computer terminal 1100 may implement and operate methods disclosed in the present disclosure.

The computer terminal 1100 may include an RF (Radio Frequency) circuit 1110, one or more than one memory unit(s) 1120 of computer-readable memory media, an input unit 1130, a display unit 1140, a sensor 1150, an audio circuit 1160, a WiFi (wireless fidelity) module 1170, at least one processor 1180, and a power supply 1190. Those of ordinary skill in the art may understand that the structure of the computer terminal 1100 shown in FIG. 11 does not constitute restrictions on the computer terminal 1100. Compared with what may be shown in the figure, more or fewer components may be included, or certain components may be combined, or components may be arranged differently.

The RF circuit 1110 may be configured to receive and transmit signals during the course of receiving and transmitting information and/or phone conversation. Specifically, after the RF circuit 1110 receives downlink information from a base station, it may hand off the downlink information to the processor 1180 for processing. Additionally, the RF circuit 1110 may transmit uplink data to the base station. Generally, the RF circuit 1110 may include, but may be not limited to, an antenna, at least one amplifier, a tuner, one or multiple oscillators, a subscriber identification module (SIM) card, a transceiver, a coupler, an LNA (Low Noise Amplifier), and a duplexer. The RF circuit 1110 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 1120 may be configured to store software programs and/or modules. The software programs and/or modules may be sets of instructions to be executed by the processor 1180. The processor 1180 may execute various functional applications and data processing by running the software programs and modules stored in the memory unit 1120. The memory unit 1120 may include a program memory area and a data memory area, wherein the program memory area may store the operating system and at least one functionally required application program (such as the audio playback function and image playback function); the data memory area may store data (such as audio data and phone book) created according to the use of the computer terminal 1100. Moreover, the memory unit 1120 may include high-speed random-access memory and may further include non-volatile memory, such as at least one disk memory device, flash device, or other volatile solid-state memory devices. Accordingly, the memory unit 1120 may further include a memory controller to provide the processor 1180 and the input unit 1130 with access to the memory unit 1120.

The input unit 1130 may be configured to receive information, such as numbers or characters, and create input of signals from keyboards, touch screens, mice, joysticks, optical or track balls, which are related to user configuration and function control. Specifically, the input unit 1130 may include a touch-sensitive surface 1131 and other input devices 1132. The touch-sensitive surface 1131, also called a touch screen or a touch pad, may collect touch operations by a user on or close to it (e.g., touch operations on the touch-sensitive surface 1131 or close to the touch-sensitive surface 1131 by the user using a finger, a stylus, and/or any other appropriate object or attachment) and drive corresponding connecting devices according to preset programs. The touch-sensitive surface 1131 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen may be contacted, and then send the touch point coordinates information to the processor 1180. The touch controller may also receive commands sent by the processor 1180 for execution. Moreover, the touch-sensitive surface 1131 may be realized by adopting multiple types of touch-sensitive surfaces, such as resistive, capacitive, infrared, and/or surface acoustic sound wave surfaces. Besides the touch-sensitive surface 1131, the input unit 1130 may further include other input devices 1132, such as the input devices 1132 may also include, but not limited to, one or multiple types of physical keyboards, functional keys (for example, volume control buttons and switch buttons), trackballs, mice, and/or joysticks.

The display unit 1140 may be configured to display information input by the user, provided to the user, and various graphical user interfaces on the computer terminal 1100. These graphical user interfaces may be composed of graphics, texts, icons, videos, and/or combinations thereof. The display unit 1140 may include a display panel 1141. The display panel 1141 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 1131 may cover the display panel 1141. After the touch-sensitive surface 1131 detects touch operations on it or nearby, it may transmit signals of the touch operations to the processor 1180 to determine the type of the touch event. Afterwards, according to the type of the touch event, the processor 1180 may provide corresponding visual output on the display panel 1141. In FIG. 11, the touch-sensitive surface 1131 and the display panel 1141 realize the input and output functions as two independent components. Alternatively, the touch-sensitive surface 1131 and the display panel 1141 may be integrated to realize the input and output functions.

The computer terminal 1100 may further include at least one type of sensor 1150, for example, an optical sensor, a motion sensor, and other sensors. An optical sensor may include an environmental optical sensor and a proximity sensor, wherein the environmental optical sensor may adjust the brightness of the display panel 1141 according to the brightness of the environment, and the proximity sensor may turn off the display panel 1141 and/or back light when the computer terminal 1100 may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the computer terminal 1100 (e.g., switching screen orientation, related games, and magnetometer calibration) and functions related to vibration recognition (e.g., pedometers and tapping); the computer terminal 1100 may also be configured with a gyroscope, barometer, hygrometer, thermometer, infrared sensor, and other sensors.

An audio circuit 1160, a speaker 1161, and a microphone 1162 may provide audio interfaces between the user and the computer terminal 1100. The audio circuit 1160 may transmit the electric signals, which are converted from the received audio data, to the speaker 1161, and the speaker 1161 may convert them into the output of sound signals; on the other hand, the microphone 1162 may convert the collected sound signals into electric signals, which may be converted into audio data after they are received by the audio circuit 1160; after the audio data may be output to the processor 1180 for processing, it may be transmitted via the RF circuit 1110 to, for example, another terminal; or the audio data may be output to the memory unit 1120 for further processing. The audio circuit 1160 may further include an earplug jack to provide communication between earplugs and the computer terminal 1100.

WiFi may be a short-distance wireless transmission technology. Via the WiFi module 1170, the computer terminal 1100 may help users receive and send emails, browse web pages, and visit streaming media. The WiFi module 1170 may provide the user with wireless broadband Internet access.

The processor 1180 may be the control center of the computer terminal 1100. The processor 1180 may connect to various parts of the entire computer terminal 1100 utilizing various interfaces and circuits. The processor 1180 may conduct overall monitoring of the computer terminal 1100 by running or executing the software programs and/or modules stored in the memory unit 1120, calling the data stored in the memory unit 1120, and executing various functions and processing data of the computer terminal 1100. The processor 1180 may include one or multiple processing core(s). The processor 1180 may integrate an application processor and a modem processor, wherein the application processor may process the operating system, user interface, and application programs, and the modem processor may process wireless communication.

The computer terminal 1100 may further include a power supply 1190 (for example a battery), which supplies power to various components. The power supply may be logically connected to the processor 1180 via a power management system so that charging, discharging, power consumption management, and other functions may be realized via the power management system. The power supply 1190 may further include one or more than one DC or AC power supply, a recharging system, a power failure detection circuit, a power converter or inverter, a power status indicator, and other random components.

Further, the computer terminal 1100 may also include a camera, Bluetooth module, etc., which are not shown in FIG. 11.

Figure 1:
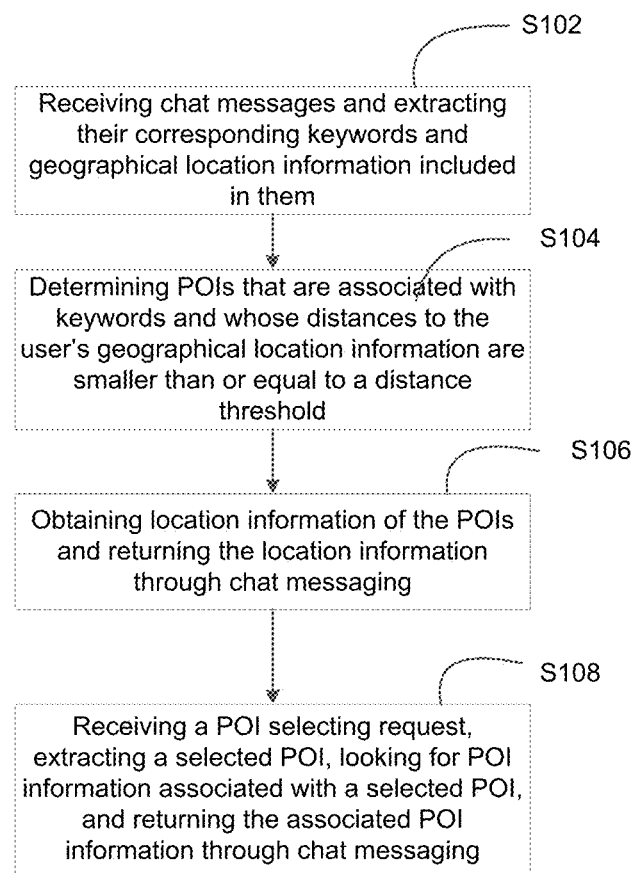
FIG. 1 is a flowchart of a method for POI recommendation according to example embodiments of the present disclosure.

FIG. 1 is a flowchart of a method for POI recommendation according to example embodiments of the present disclosure. The method may be a computer program running on an O2O application server with a Von Neumann architecture. For example, the program may be stored in the memory unit 1120 (storage medium) and is executed by the processor 1180 of the computer terminal 1100. The method for POI recommendation comprises:

Step S102: Receiving chat messages and extracting their corresponding keywords and geographical location information included therein.

In this step, a user may install in his/her mobile terminal a client program of O2O application (e.g., WeChat, a social communication platform application that providing instant messaging service between two users), wherein service accounts of multiple vendors are registered with the O2O application server. The user may go to a webpage of the O2O application server through the client program of O2O application in his/her mobile terminal and select the service account of a vendor shown on the webpage. The user may also find the vendor through other forms of information (e.g., a link or advertisement) listed through the O2O application. Because the vendor has an account registered in the O2O application server, the user may open a window (e.g., a WeChat interface) to chat (i.e., instant messaging) with the vendor over the website or over the client program of the O2O application.

Figure 2:
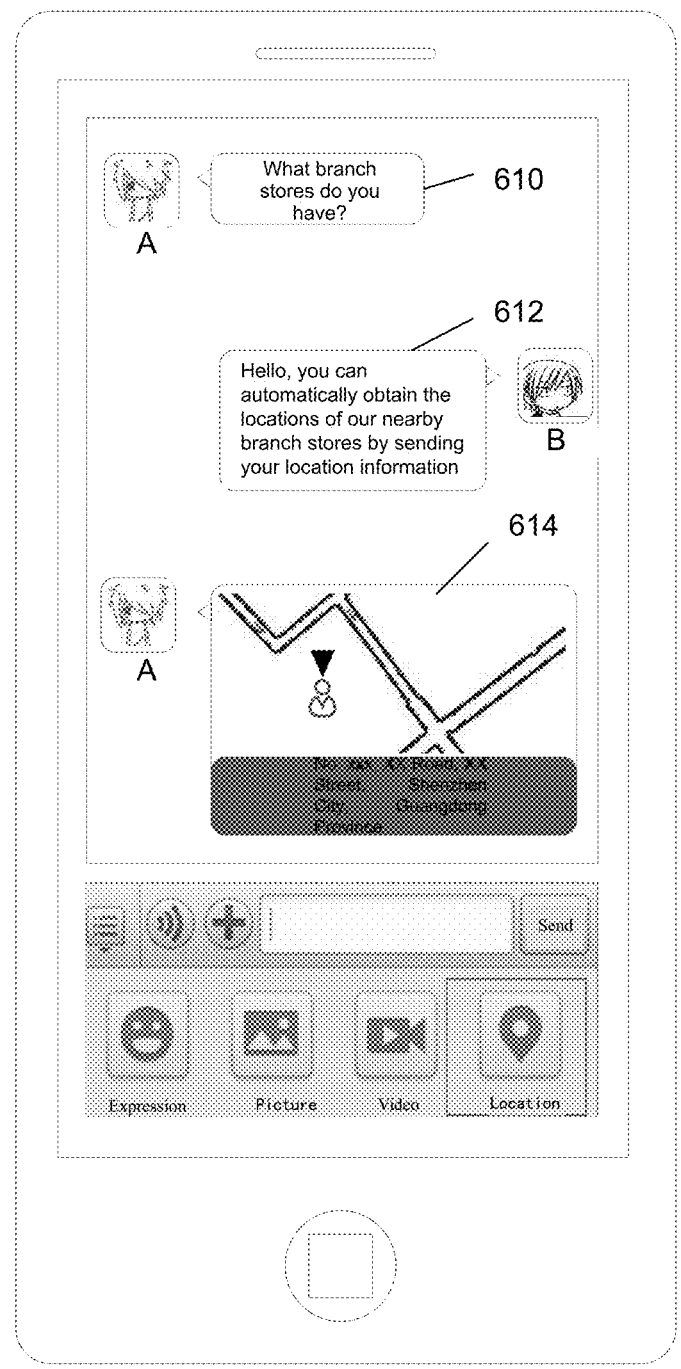
FIG. 2 is a schematic diagram of a window on a computer terminal, showing a first portion of an instant message conversation between a user and a vendor, according to example embodiments of the present disclosure.

FIG. 2 is a schematic diagram of the window for chat on the mobile terminal, showing a portion of an instant message conversation between the user A and the vendor, according to example embodiments of the present disclosure. The user A may communicate (i.e., chat) with a customer service representative B (e.g., a real person) of the vendor online in a real-time manner through the client program of O2O application on his/her mobile terminal; the customer service representative B of the vendor may reply to inquiries or questions 610 initiated by the user A through the window for chat. The user may obtain geographical location information 614 by clicking the "Send local location" button in the window for chat; the user may locate himself/herself by means of GPS positioning, BTSs of a mobile network, or WiFi hotspots. Then, the user may input the geographical location information 614 to the window for chat for use as chat messages, and send the chat messages 614 to the O2O application server; upon receiving the chat messages 614, the O2O application server may extract the geographical location information from the chat messages 614, obtain the service account associated with the chat messages 614, and obtain the vendor ID associated with the service account for use as a keyword.

In this step, the user may also input a keyword in the window for chat, and the O2O application server may extract the keyword from the chat messages.

Step S104: Determining at least one POI that is associated with the keywords and whose distance to the user's geographical location information is smaller than or equal to a threshold distance;

In this step, the O2O application server may look for one or more POIs according to the keywords, i.e., determine the ID and the location information of each associated service point (e.g., a local store) associated with the vendor according to the above vendor logo. The O2O application server may select the service points whose distance to the above geographical location information extracted from the chat messages is smaller than or equal to a preset threshold distance.

If the number of service point found by the O2O application server is larger than a threshold number, the O2O application server may select a threshold number of service points from the at least one service points based on the distances between the at least one service points and the user's geographic location. For example, if the threshold number is 10 and the threshold distance is 5 miles, and if the O2O application server finds that there are more than 20 service points (e.g., local store) within 5 miles of where the user locates, the O2O application server may select 10 closest service points from the 20 for the user, thereby decreasing the size of data of required transmissions, saving bandwidth resources, facilitating user browsing (the user is usually apt to enjoy the nearest services), and improving the convenience of operations.

If no associated POI is found, the O2O application server may gradually increase the threshold distance until an associated POI is found, i.e., the O2O application server may select a POI that is closest to the user, even if the distance to the POI is farther than the threshold distance.

The threshold distance may be preset by the user and may be adjusted by the user. The O2O application server may receive an uploaded threshold distance setting request and then adjust the threshold distance according to the threshold distance setting request. When the user sets the threshold distance at his/her discretion, the O2O application server may select appropriate POIs and then recommend them to the user according to the acceptability of the distance between the POIs and the user.

Additionally, a vendor associated with a service account on the O2O application server may upload and/or update specific POIs related to the vendor to the O2O application server. For example, the vender may upload and/or update the name and location of a specific service point (e.g., a local store that provide products and/or service sold by the vendor) to the O2O application server. Upon receiving this information, the O2O application server may store it in a POI database.

When receiving the keywords and/or the user's location information, the O2O application server may determine from the POI database POIs that are associated with the keywords and whose distance to user's geographical location are smaller than or equal to the threshold distance from the POI database.

In other words, the vendor may upload and specify POIs on the O2O application server according to the distribution of its service points. For example, when the vendor opens a branch store or relocates a store, the vendor may immediately upload the modified service point name and location information to the O2O application server, thereby ensuring that the service point information about the vendor and its service point information saved in the O2O application server is up-to-date and will not mislead any consumers.

Additionally, Step S104 may be preceded by: determining whether a LBS (Location-based services) query function is enabled. Here the LBS means computer program-level information service that is provided based on information on the geographical position of a mobile device. If the LBS query function is enabled, the O2O application server may perform Step S104. If not, the O2O application server may forward the chat messages to a customer service representative.

In other words, if the vendor does not have and/or provide and/or order the LBS query function on the O2O application server, the vendor's customer service representative may communicate with consumers in a real-time manner and provide human-operated services, thereby improving the quality of services and user experience.

Step S106: Obtaining the location information of the POIs and returning the location information through chat messaging.

Figure 3:
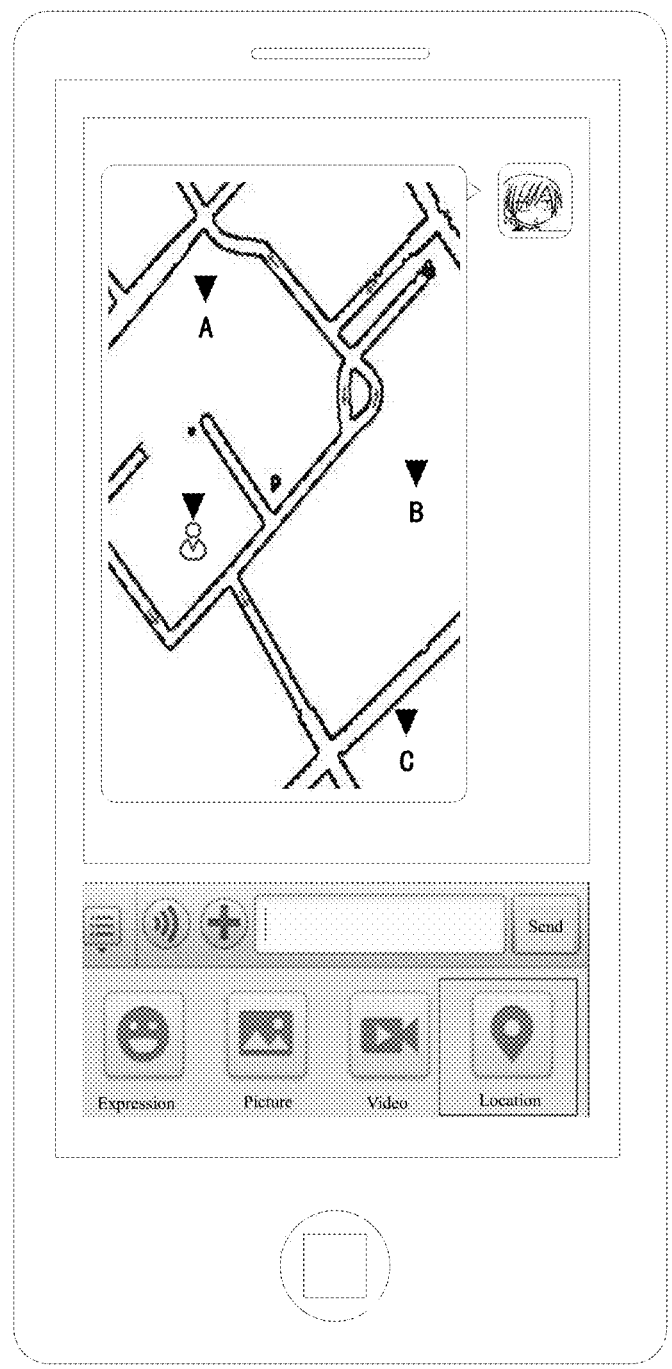
FIG. 3 is the schematic diagram of the window for the computer terminal, showing a second portion of the instant message conversation between the user and the vendor, according to example embodiments of the present disclosure.

In this embodiment, the location information of the POIs may be returned through a page containing a map, as shown in FIG. 3. The map may include map components and the location information of the POIs being labeled in the map. The user may view the map in the window for chat and learn about the distribution of the POIs nearby.

Figure 4:
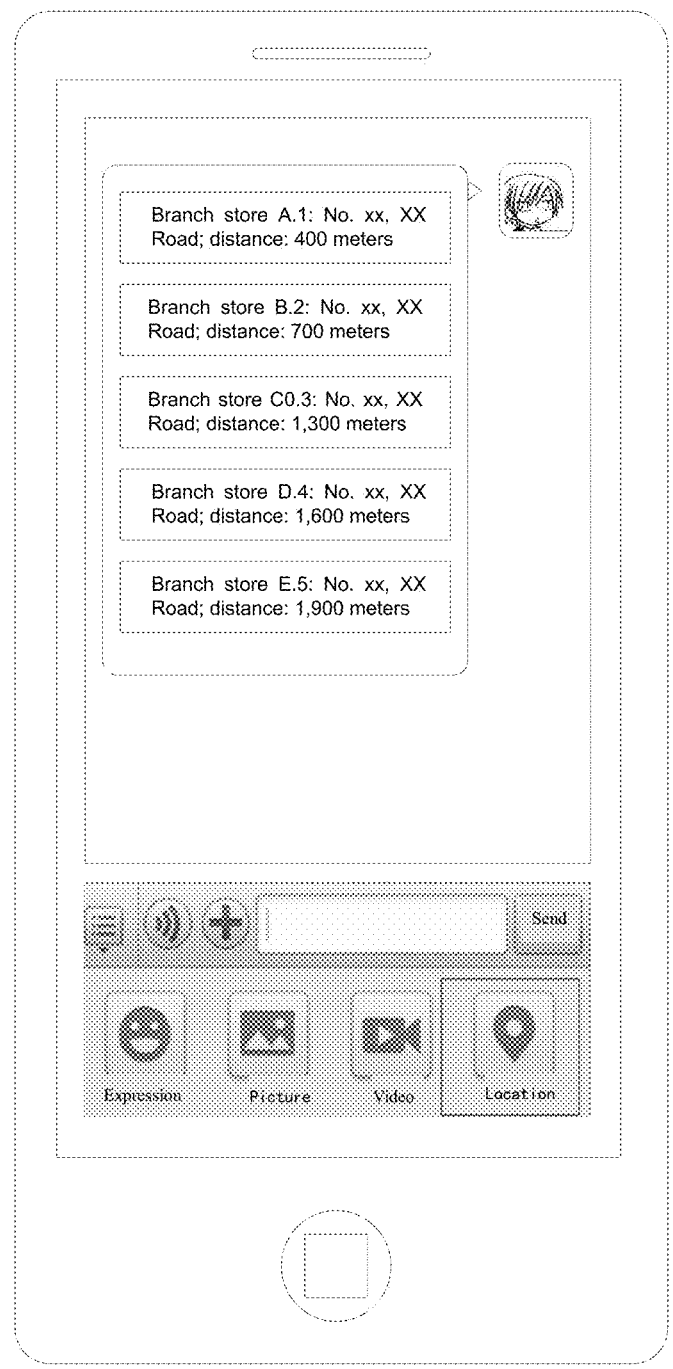
FIG. 4 is the schematic diagram of the window for the computer terminal, showing a third portion of the instant message conversation between the user and the vendor, according to example embodiments of the present disclosure.

In other embodiments, the location information of the POIs may also be returned in the form of a list. As shown in FIG. 4, the list may contain the names and locations of the POIs, and distance between the POIs and the user. If a POI is a service point of the vendor in the O2O application, the list may further contain review information of the service point.

Step S108: Receiving a POI selecting request, extracting a selected POI, looking for POI information associated with the selected POI, and returning the associated POI information through chat messaging.

After receiving the map with the obtained POIs labeled thereon, the user may click to select a labeled POI in the map page displayed in the window for chat associated with the vendor's service account. After selecting a POI, the user (i.e., the mobile device that the user is using) may upload the ID of the selected POI to the O2O application server, and then the O2O application server may retrieve from the POI database and return the POI information associated with the selected POI.

The POI information may contain a service page. The service page may be uploaded together with the POI names and POI location information by the vendor. The service page may contain text and illustrations, phone numbers, and service numbers (including QQ and/or MSN numbers for customer services, WeChat numbers for customer services, and AliTalk and/or Skype and/or Google Talk for customer services) of the POI. The user may view the service page in a window for chat, and learn about the services of the POI. If the user clicks a phone number, the mobile phone held by the user automatically dials the phone number; if the user clicks the service number, the mobile phone automatically loads an associated application and opens a window for chat associated with the service number.

Additionally, before the step of returning POI information through chat messaging, the method further comprises: determining whether the POI information includes a service page, and if not, automatically generating an associated service page according to the POI information. If the vendor does not upload any customized service page, the O2O application server may generate a service page through a preset standard template and add the POI-related information (for example, POI names, POI locations, and service numbers) to the service page.

Further, after the step of returning POI information through chat messaging, the method further comprises: obtaining an uploaded navigation request associated with the selected POI, and generating and returning navigation guidance (e.g., driving direction etc.) according to the extracted geographical location information and the location information of the selected POI.

Figure 5:
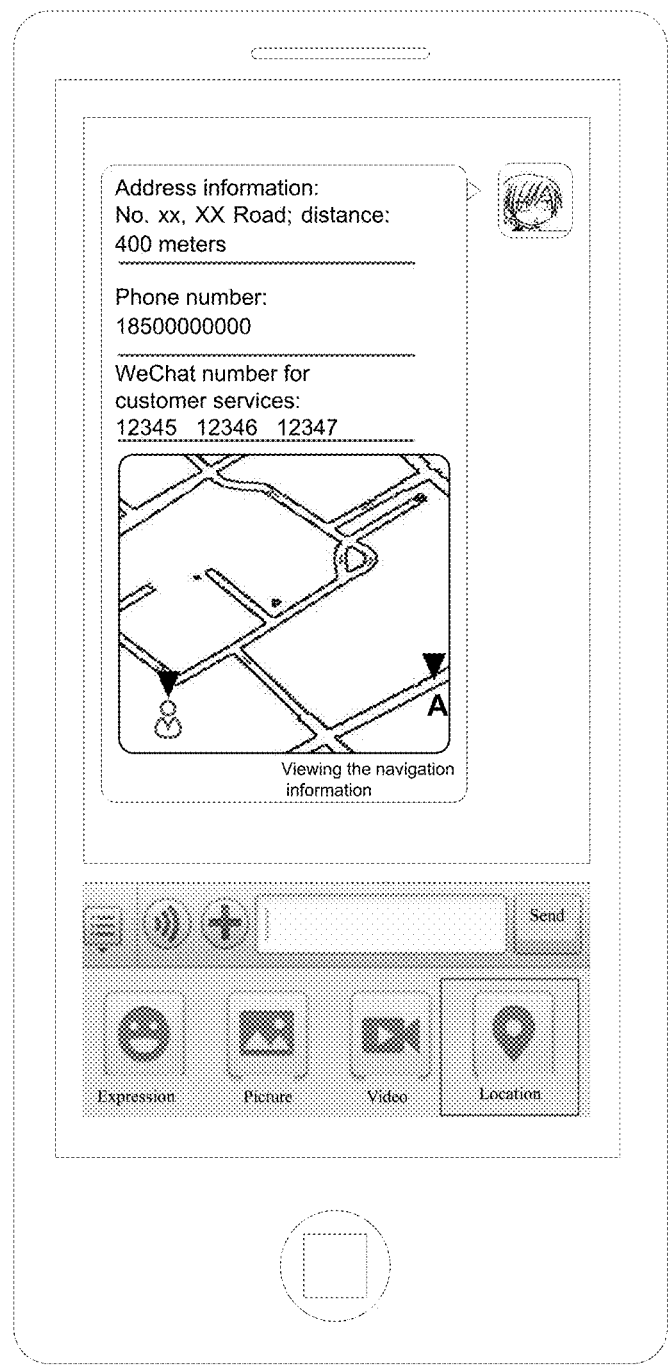
FIG. 5 is the schematic diagram of the window for the computer terminal, showing a fourth portion of the instant message conversation between the user and the vendor, according to example embodiments of the present disclosure.

FIG. 5 is the schematic diagram of the window for the mobile terminal, showing a portion of the instant message conversation between the user and the vendor, according to example embodiments of the present disclosure. As shown in FIG. 5, the user may initiate a navigation request by clicking a link "View the navigation information" on the service page, and the O2O application server may generate and return navigation guidance according to the extracted geographical location information and the location information of the selected POI (e.g., from the user's current geographical location to the location of the selected POI). In other embodiments, the O2O application server may send the extracted geographical location information and the location information of the selected POI to a third-party map tool server, such as Google map, then the third-party map tool server generates and returns the navigation guidance to the O2O application server, and the O2O application server returns the navigation guidance to the user.

Figure 6:
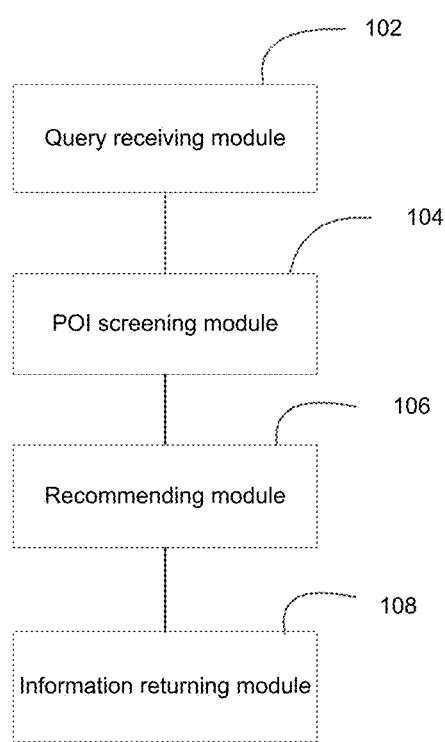
FIG. 6 shows a structural diagram of a device for POI recommendation according to example embodiments of the present disclosure.

FIG. 6 shows a structural diagram of a device for POI recommendation according to example embodiments of the present disclosure. The device may be the computer device 1100 and functionally be structured as the following:

A query receiving module (102), configured to receive chat messages and extract their corresponding keywords and geographical location information included in the chat messages;

A POI screening module (104), configured to find, determine, and/or select at least one POI that is associated with the keywords and whose distance to the geographical location information is smaller than or equal to a threshold distance;

A recommending module (106), configured to obtain the location information of the at least one POI and returning the location information through chat messaging;

An information returning module (108), configured to receive a POI selecting request from the user, extract a selected POI from the at least one POI, retrieve POI information associated with the selected POI, and return the associated POI information through chat messaging.

Figure 7:
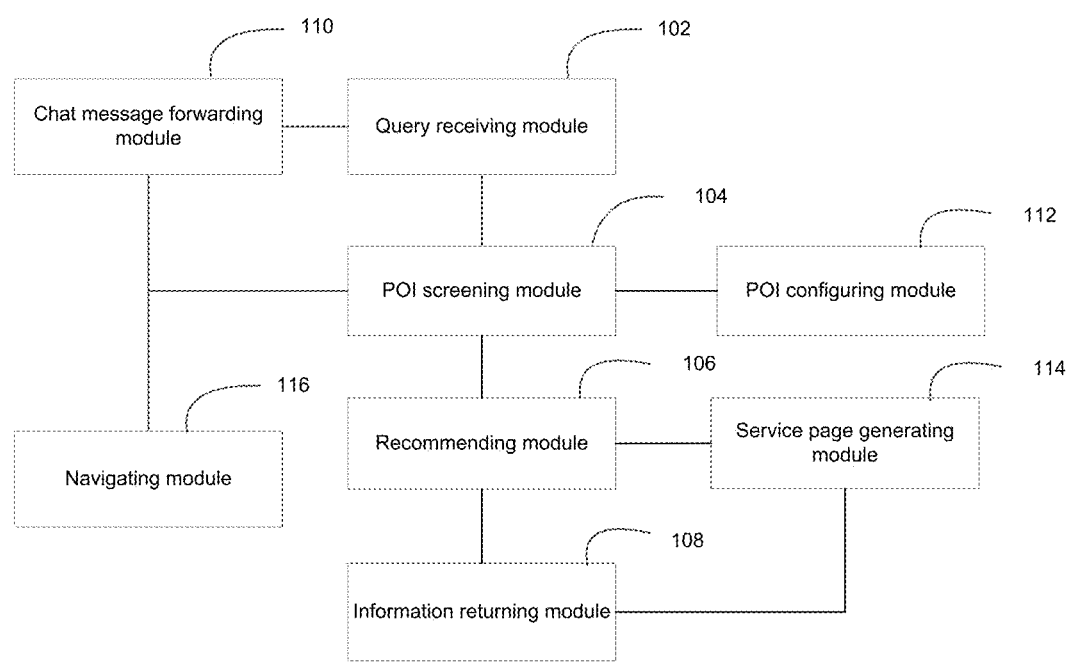
FIG. 7 shows a structural diagram of another device for POI recommendation according to example embodiments of the present disclosure.

FIG. 7 shows a structural diagram of another device for POI recommendation according to example embodiments of the present disclosure. In addition to the modules in FIG. 6, the device for POI recommendation provided in FIG. 7 further comprises a chat messages forwarding module (110) configured to determine whether the LBS query function is enabled, and if not, forward the chat messages to a customer service representative.

As shown in FIG. 7, the device for POI recommendation further comprises a POI configuration module (112) configured to obtain an uploaded POI name and POI location information and store them in a POI database;

The POI screening module 104 is further configured to look for a POI that is associated with the keywords and whose distance to the geographical location information is smaller than or equal to a threshold distance from the POI database.

As shown in FIG. 7, the device for POI recommendation further comprises a service page generating module (112) configured to determine whether the POI information includes a service page, and if not, automatically generate an associated service page according to the POI information.

As shown in FIG. 7, the device for POI recommendation further comprises a navigation module (116) configured to obtain an uploaded navigation request associated with a selected POI and generate and return navigation guidance according to the extracted geographical location information and the location information of the selected POI.

Figure 8:
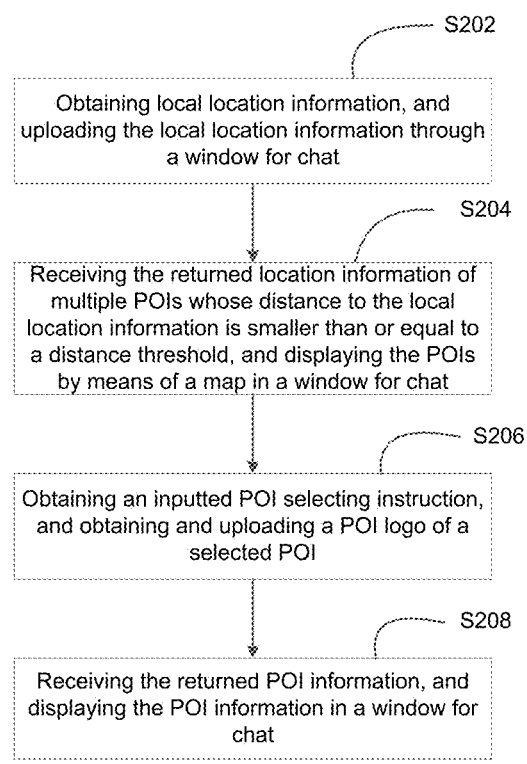
FIG. 8 shows a flowchart of a method for obtaining a recommended POI according to example embodiments of the present disclosure.

FIG. 8 shows a flowchart of a method for obtaining a recommended POI according to example embodiments of the present disclosure. The method may be implemented in a computer program, such as an O2O application, running on a mobile device with a Von Neumann architecture, and the mobile device may be, for example, a smartphone, a tablet computer, a palm computer, an ultrabook, or a notebook computer. For example, the program may be stored in the memory unit 1120 (storage medium) and is executed by the processor 1180 in FIG. 11. The method for obtaining a recommended POI comprises:

Step S202: Obtaining local location information, and uploading the local location information through a window for chat.

Step S204: Receiving the returned location information of multiple POIs whose distance to the local location is smaller than or equal to a threshold distance, and displaying the POIs by means of a map in the window for chat.

Step S206: Obtaining an inputted POI selecting instruction from a user of the mobile device, and obtaining and uploading a POI ID of a selected POI.

Step S208: Receiving the returned POI information, and displaying the POI information in the window for chat.

As shown in FIGS. 2-5, the user may open a window for chatting with a vendor on his/her mobile phone, and obtain his/her current location information by clicking the "Send current location" button; the user may locate himself/herself by means of GPS positioning, BTSs of a mobile network, or WiFi hotspots first, and then upload the local location information to the O2O application server through chat messaging. The O2O application server may extract geographical location information according to the chat messages, obtain the vendor ID associated with the service account according to the chat messages, look for the location information of the POIs associated with the vendor logo, and determine and return the POIs whose distance to the extracted user geographical location information is smaller than or equal to a threshold distance.

The user may open a window for chat with the vendor and then view the returned multiple POIs that are displayed in the form of a map. The returned multiple POIs are all labeled in the map, the user may click to select the multiple POIs and notify the O2O application server, and the O2O application server may return a service page associated with the selected POIs. The service page may be pre-uploaded by the vendor or be automatically generated by the O2O application server according to a standard template and related information of the POIs. Likewise, the user may view the service page in the window for chat with the vendor by using a mobile phone.

The POI information may include phone numbers and/or service numbers of the POI (e.g., service point and/or local store of the vendor);

The step of displaying the chat messages in a window for chat may be further followed by: obtaining a triggering instruction associated with the phone numbers or service numbers, and dialing the phone numbers or displaying the window for chat associated with the service numbers.

The service page may contain phone numbers and/or service numbers; if the user clicks a phone number, the mobile phone held by the user automatically dials the phone number; if the user clicks a service number (for example, a WeChat number or a QQ or MSN number for customer services), the mobile phone automatically loads an associated application and opens a window for chat associated with the service number.

The step of displaying the POI information in a window for chat may be further followed by: obtaining an inputted navigation requesting instruction associated with a selected POI and uploading it, and obtaining the returned navigation guidance associated with the location information of a selected POI and the local location information and displaying it.

Figure 9:
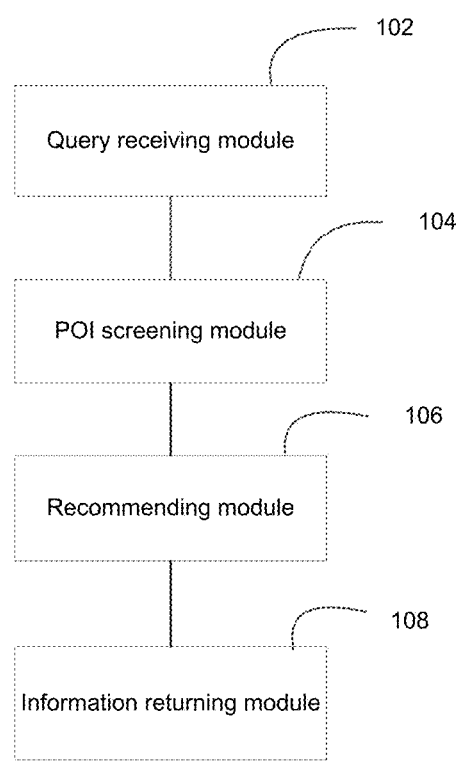
FIG. 9 shows a structural diagram of a device for obtaining a recommended POI according to example embodiments of the present disclosure.

FIG. 9 shows a structural diagram of a device for obtaining a recommended POI according to example embodiments of the present disclosure. The device may be a mobile device with a Von Neumann architecture, and the mobile device may be, for example, the computer device 1100, such as a smartphone, a tablet computer, a palm computer, an ultrabook, or a notebook computer. The device comprises:

A message sending module (202), configured to obtain local location information and upload it through a window for chat;

A POI displaying module (204), configured to receive the returned location information of multiple POIs whose distance to the local location is smaller than or equal to a threshold distance, and display the POIs by means of a map in the window for chat;

A POI selecting module (206), configured to obtain an inputted POI selecting instruction, and obtain a POI ID of a selected POI and upload it;

A service information displaying module (208), configured to receive the returned POI information and display the POI information in the window for chat.

Figure 10:
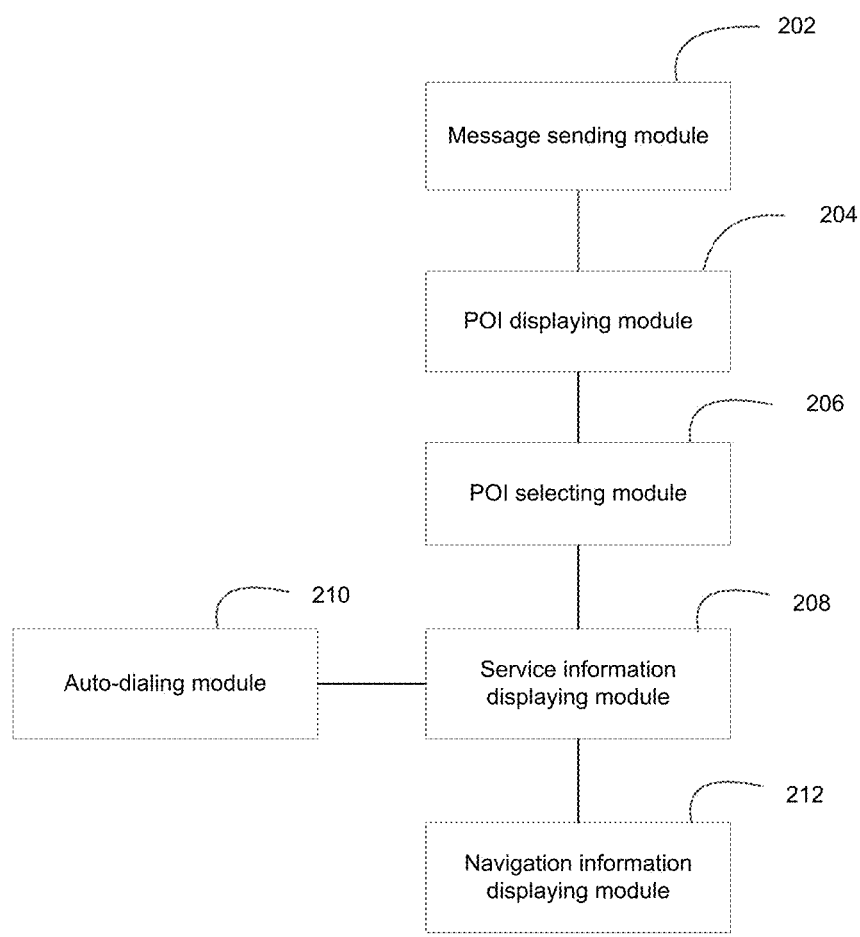
FIG. 10 shows a structural diagram of another device for obtaining a recommended POI according to example embodiments of the present disclosure.

Here, the POI information includes phone numbers and/or service numbers;

As shown in FIG. 10, the device for obtaining a recommended POI further comprises an auto-dialing module (210), configured to obtain a triggering instruction associated with phone numbers or service numbers and dial the phone numbers or display the windows of chat associated with service numbers.

As shown in FIG. 10, the device for obtaining a recommended POI provided in this embodiment further comprises a navigation information displaying module (212) configured to obtain and upload an inputted navigation requesting instruction associated with a selected POI, and obtain and display the returned navigation guidance associated with the location information of a selected POI and the local location information.

The above method and device for POI recommendation may obtain the local location information uploaded by the user according to the chat messages of the service account used during O2O applications, and then recommend POIs to the user according to the geographical location information. In this way, the locations of the POIs recommended to the user during the O2O applications are all nearby POIs; in addition, the user may know whether the nearby POIs satisfy his/her service needs according to the selected POI information, and quickly and conveniently select the nearest POIs satisfying his/her service needs for offline services, so the operation is more convenient for the user.

In the above method and device for obtaining a recommended POI, the user may simply input a local location uploading instruction through the window for chat of the service account used during the O2O applications to obtain the information of the multiple recommended POIs near his/her location. In this way, the user may quickly obtain the nearby POIs that satisfy his/her service needs, so the operation is more convenient for the user.

A person of ordinary skilled in the art may understand that all or some of the flows in the methods provided in the above embodiments of the present disclosure may be implemented by instructing related hardware through a computer program, and the computer program may be stored in a computer readable storage medium, and may comprise the flows in the embodiments of the methods of the present disclosure stated above, wherein the storage medium may be, for example, a disk, a CD, a read-only memory (ROM), or a random access memory (RAM).

The above embodiments only disclose example embodiments of the present disclosure, which are described in detail but do not restrict the scope of claims of the present disclosure. It should be noted that without deviating from the conception of the present disclosure, a person of ordinary skills in the art may make some modifications and improvements, which should nevertheless fall within the scope of patent protection of the present disclosure. Therefore, the scope of protection for the present disclosure should be as defined by the attached claims.

The invention claimed is:

1. A method performed by a server of a social communication platform for electronic conversation between a first user and a second user over a first user device and second user device via a corresponding first user account and a corresponding second user account in the social communication platform, the method comprising:
   receiving a first graphic message sent from the first user device targeting the second user device containing geographic location of the first user device and a chat message;
   determining whether the second user account is of a service type; and
   upon determining that the second user account is of the service type:
     automatically extracting a keyword entered by the first user device in the chat message;
     automatically obtaining at least one place of interest among a plurality of places of interest pre-recorded in the server using a place-of-interest updating procedure under the second user account or a third user account in the social communication platform represented by the second user based on the keyword extracted from the chat message and based on distances between the geographic location of the first device and geographic locations of the plurality of places of interest satisfying a predetermined distance criterion;
     generating a second message containing geographic location of at least one place of interest; and
     communicating the second message to the first user device.

2. The method of claim 1, wherein the second message comprises a graphic message containing a map of the at least one place of interest.

3. The method of claim 1, wherein the second message comprises a list of the at least one place of interest.

4. The method of claim 3, wherein each of the at least one place of interest is selectable by the first user on the first user device.

5. The method of claim 4, further comprising:
   receiving a selection of one place of interest among the at least one place of interest from the first user on the first user device; and
   providing a pre-loaded service page of for the one place of interest to a service page interface on the first user device.

6. The method of claim 4, further comprising:
receiving a selection of one place of interest among the at least one place of interest from the first user on the first user device; and
generating a service page of for the one place of interest in real-time based on a pre-stored service page template.

7. The method of claim 1, further comprising:
providing a service provider interface for the first user on the first user device to select the second user with the second user account of the service type.

8. A computer server, comprising:
a processor-readable storage medium storing instructions; and
a processor in communication with the storage medium, wherein the processor, when executing the instructions, is directed to:
provide an application for social communication from user devices;
provide a normal type of user accounts and a service type of user accounts;
provide an account management interface in the application for a user having a service type of user account to input and pre-record a plurality of places of interest under an account of the user;
provide an electronic conversation interface in the application for a first user having a first user account to communicate, from a first user computer device, with a second user having a second user account;
determine the first user account is of the normal type and the second user account is of the service type; and
upon receiving a first graphic message by the application in the first user account containing geographic location of the first computer device to the second user account and a chat message, automatically:
extract a keyword entered by the first user device in the chat message search among the plurality of places of interest in the second user account to obtain at least one place of interest based on the keyword extracted from the chat message and based on distances between the geographic location of the user device and geographic locations of the plurality of places of interest in the second user account satisfying a predetermined distance criterion;
generate a second message containing geographic location of at least one of the at least one place of interest under the second user account based on the geographic location of the first computer device; and
send the second message to be displayed on the electronic conversation interface on the first computer.

9. The computer server of claim 8, wherein the second message comprises a graphic message.

10. The computer server of claim 8, wherein the second message comprises a list of the at least one of the at least one place of interest under the second user account.

11. The computer server of claim 10, wherein each of the at least one of the at least one place of interest under the second user account is selectable by the first user in the electronic conversation interface.

12. The computer server of claim 11, wherein the processor, when executing the instructions, is further directed to:
receive a selection from the first user among the at least one of the at least one place of interest under the second user account; and
provide a service page of for the selection that is preloaded in the second user account to a service page interface of the application on the first user computer device.

13. The computer server of claim 11, wherein the processor, when executing the instructions, is further directed to:
receive a selection from the first user among the at least one of the at least one place of interest under the second user account; and
generate a service page of for the selection in real-time based on a service page template stored in the computer server.

14. The computer server of claim 8, wherein the processor, when executing the instructions, is further directed to:
provide a service provider interface in the application for the first user to select the second user with the second user account of the service type.

* * * * *